A. P. LEE.
MOVABLE LOADING HOPPER.
APPLICATION FILED MAR. 2, 1915.
1,342,919.
Patented June 8, 1920.
5 SHEETS—SHEET 1.
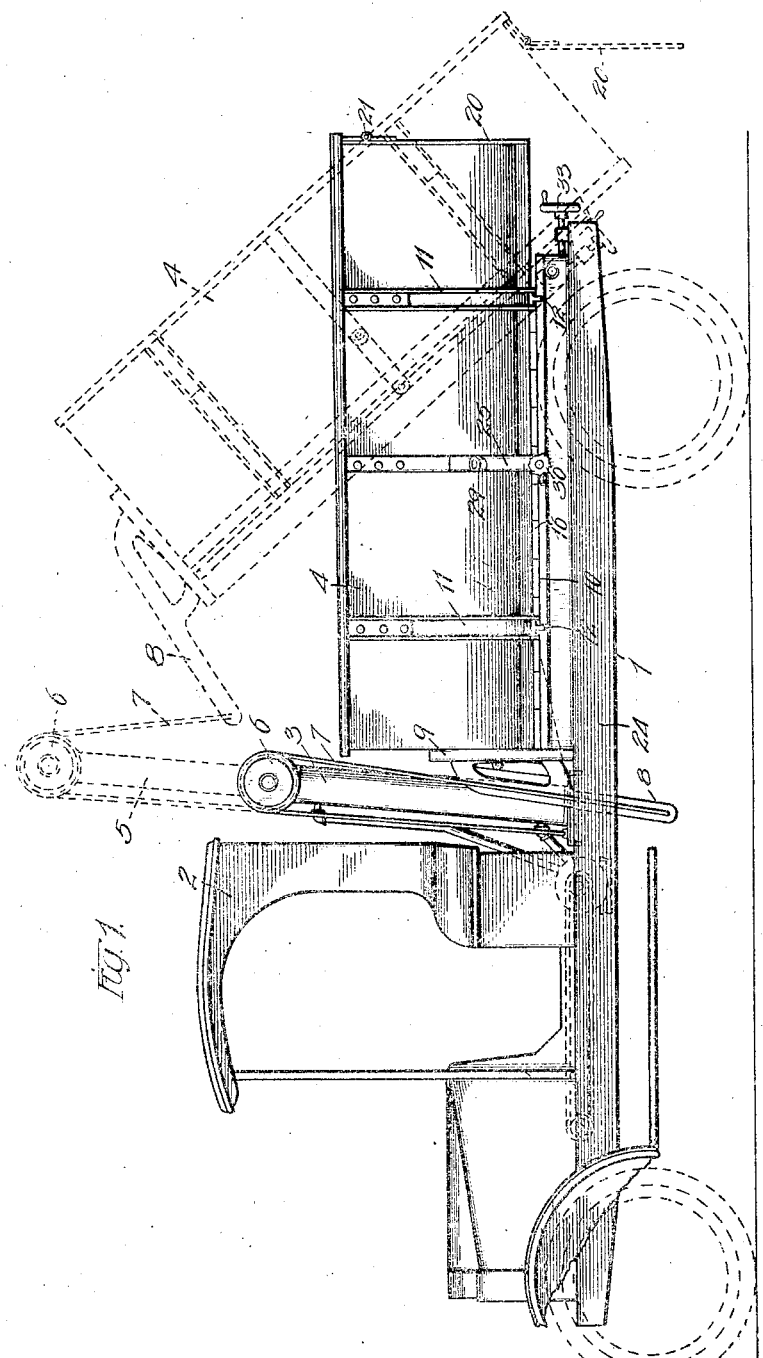

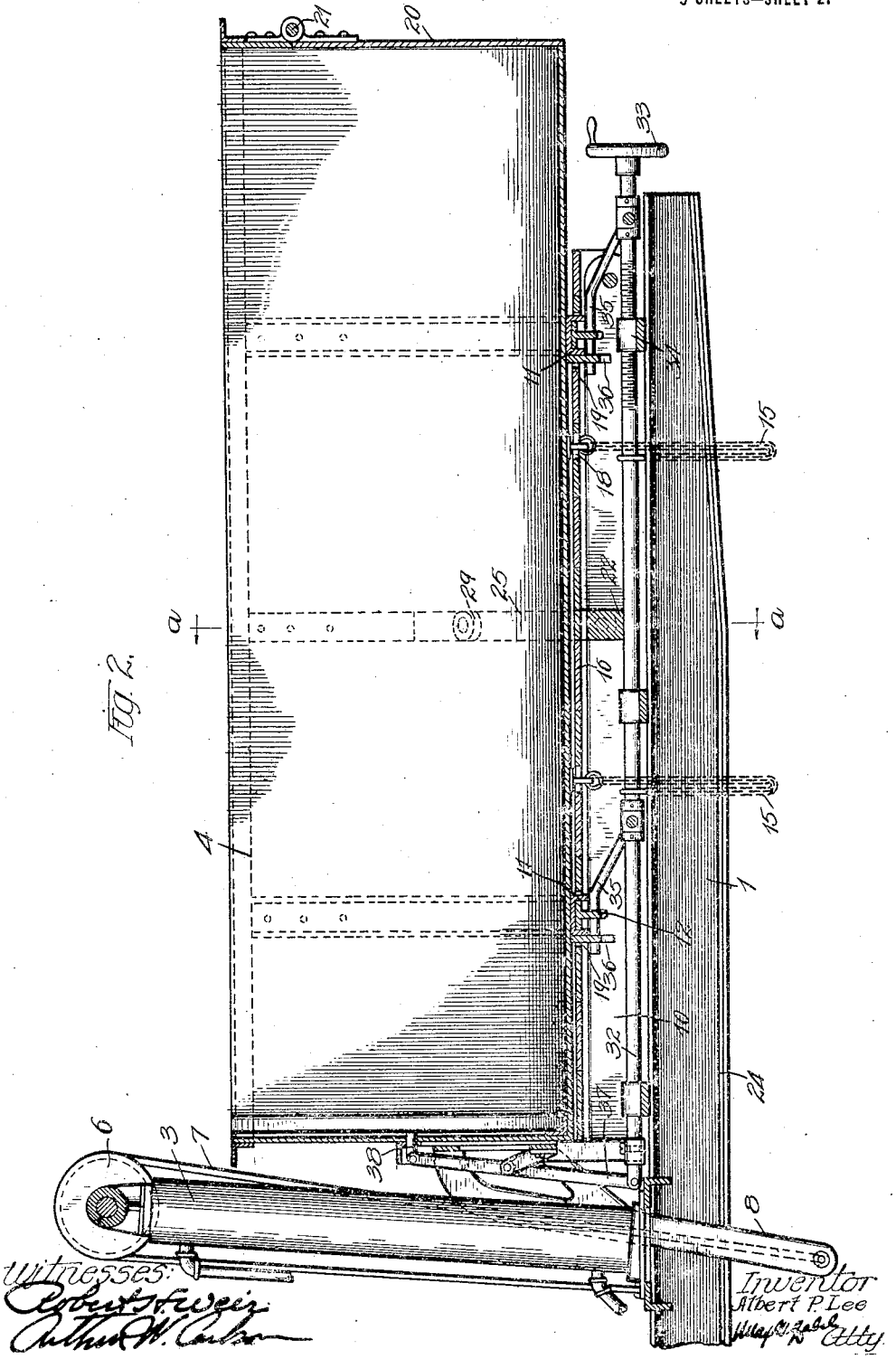

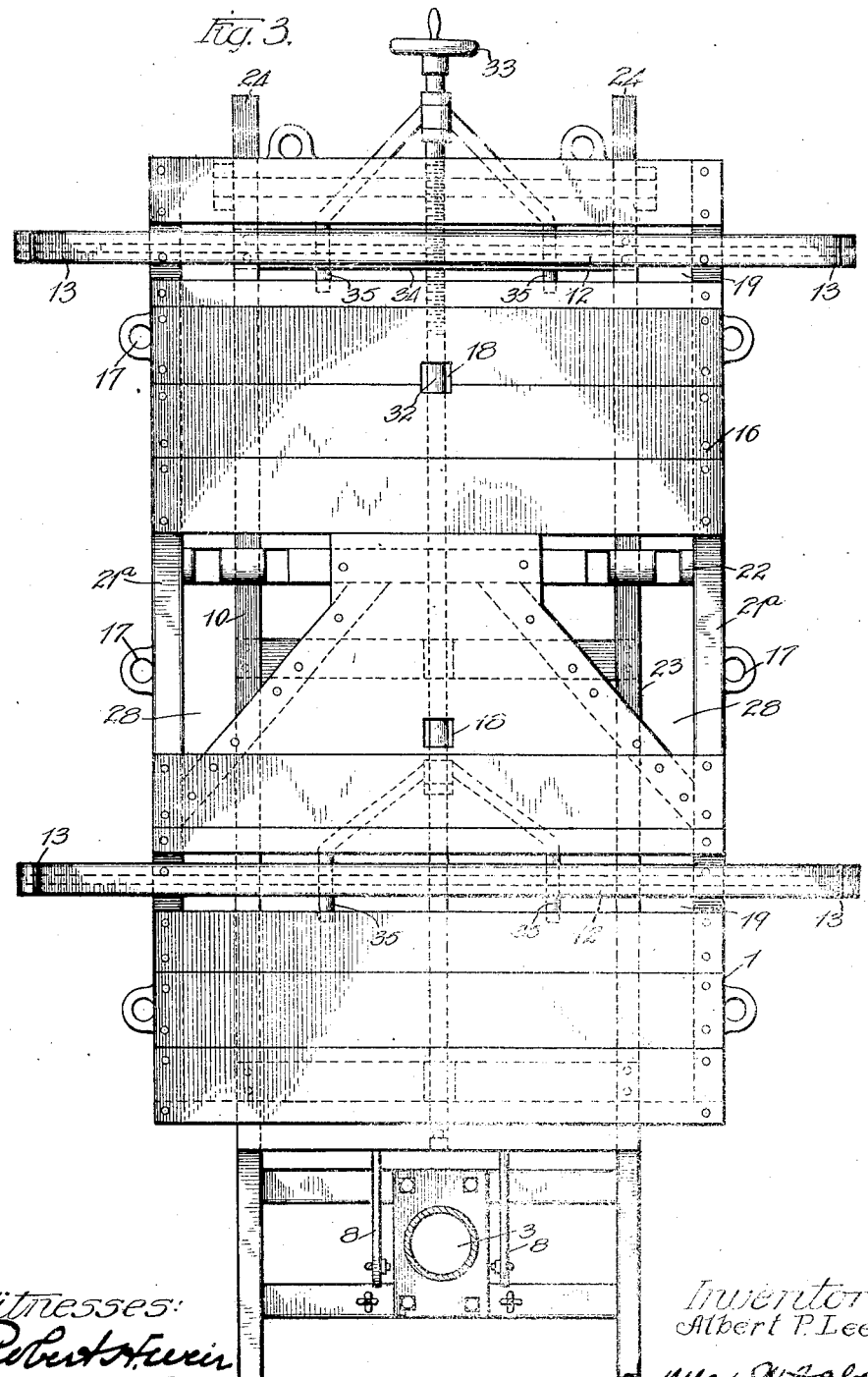

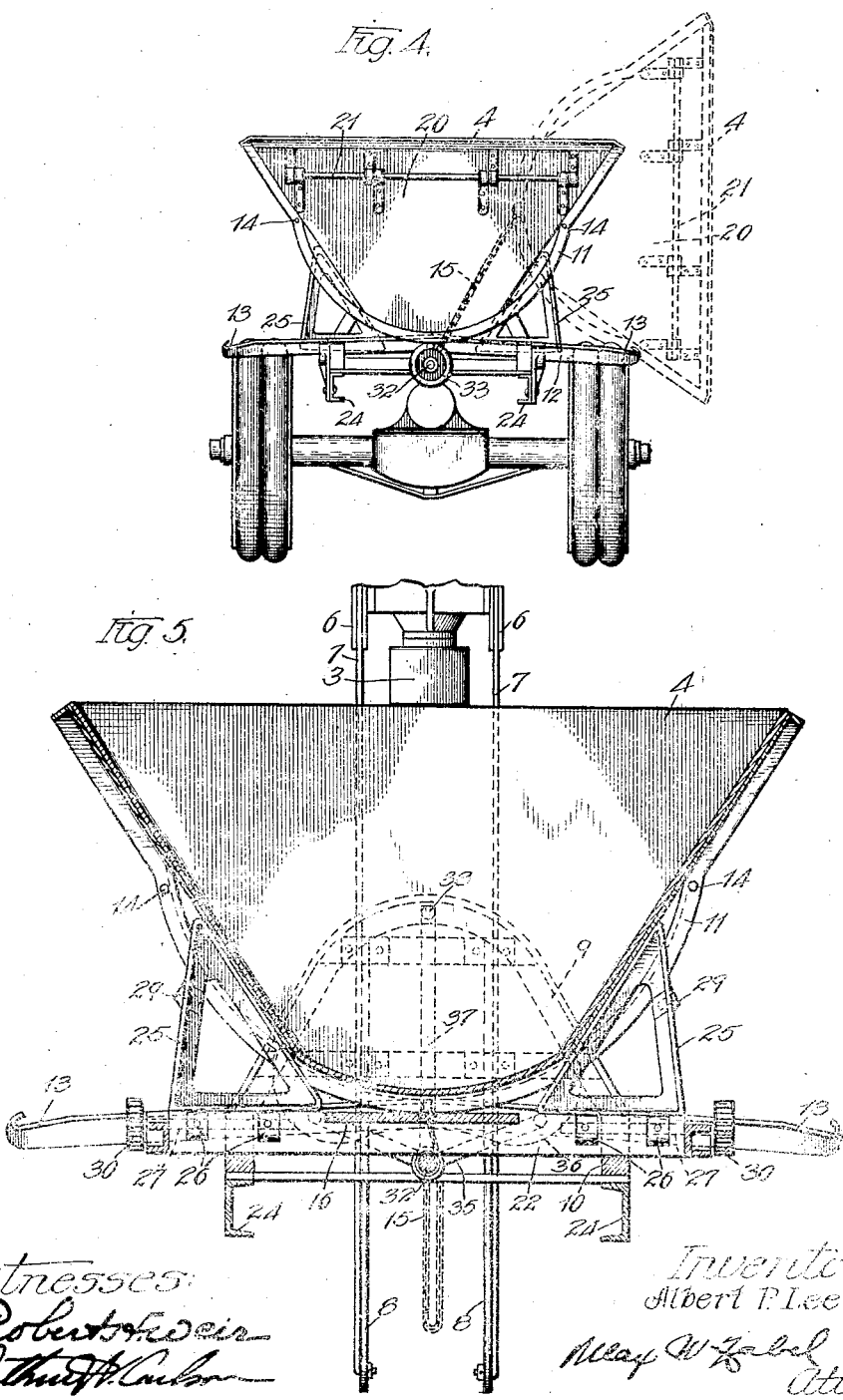

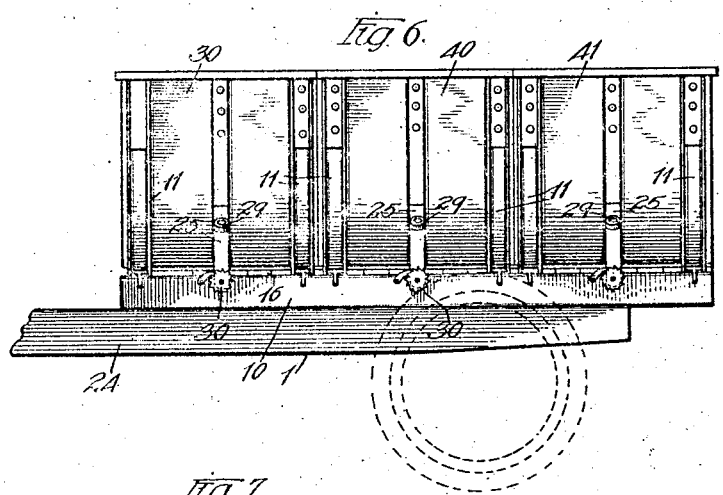
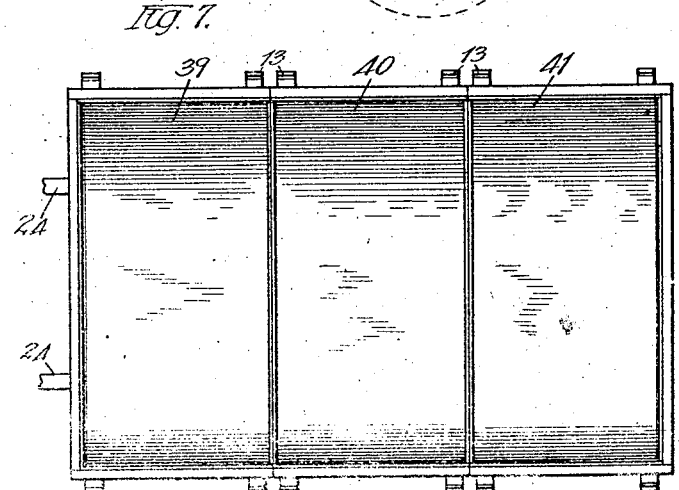
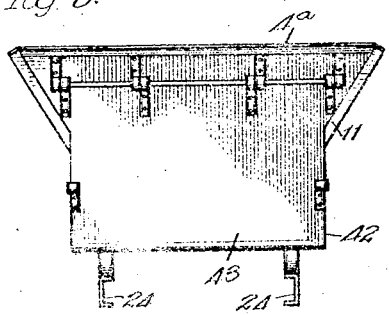
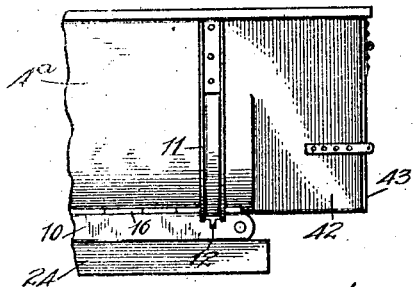

UNITED STATES PATENT OFFICE.

ALBERT P. LEE, OF CHICAGO, ILLINOIS, ASSIGNOR TO LEE LOADER & BODY CO., OF CHICAGO, ILLINOIS.

MOVABLE LOADING-HOPPER.

1,342,919.  Specification of Letters Patent.  Patented June 8, 1920.

Continuation of application Serial No. 728,398, filed October 29, 1912. This application filed March 2, 1915. Serial No. 11,584.

*To all whom it may concern:*

Be it known that I, ALBERT P. LEE, a citizen of the United States, residing at Chicago, in the county of Cook and State of Illinois, have invented a certain new and useful Improvement in Movable Loading-Hoppers, of which the following is a full, clear, concise, and exact description, reference being had to the accompanying drawings, forming a part of this specification.

My invention relates to trucks and is more particularly of value in connection with trucks having a movable hopper. In one form of my invention the hopper is arranged so that it may dump to either side and may also dump to the rear of the truck. The device is so arranged that a hopper may be provided, if desired, upon a platform so that this hopper may be removed under certain conditions and the truck used as an ordinary platform truck.

The preferred form of hopper which I use has preferably a rounded bottom so that it can roll from side to side to discharge its load to either side of the vehicle. Means are then provided so that the same hopper may be tilted toward the rear of the vehicle to discharge its load at the rear of said vehicle. The arrangement is such that the hopper can roll far enough to one side of the vehicle on which it is mounted so that it can discharge its load clear of the wheels thereof. This is a very important consideration as in the several side dumping trucks the load is not discharged far enough from the vehicle. Suitable means are provided to lock the hopper in position, and suitable means are provided to elevate one extremity when the load is to be discharged toward the rear.

This application as to the three-way dumping feature is a continuation of my application Serial No. 728,398, filed October 29, 1912.

I will explain one form which my invention may take more in detail by referring to the accompanying drawings illustrating the same, in which—

Figure 1 is a side view of a truck constructed in accordance with my invention;

Fig. 2 is a longitudinal sectional view of the hopper portion and its associated mechanism;

Fig. 3 is a top view of the truck, the hopper being removed;

Fig. 4 is an end view of the hopper portion omitting the hoisting mechanism and cab;

Fig. 5 is a sectional view on line *a—a* of Fig. 2;

Figs. 6 and 7 are side and top views respectively of a modification, and

Figs. 8 and 9 are rear and fragmentary side views respectively of another modification.

Referring more particularly to Fig. 1, my improved truck comprises the chassis 1 having a suitable cab 2. A hydraulic hoist 3 is provided to operate a movable hopper 4. This movable hopper is shown in its normal position in full lines in Fig. 1, and is shown in one of its discharge positions by dotted lines in Fig. 1. The hydraulic hoist 3 has a plunger 5 controlling a suitable sheave 6 so that the elevation or depression of this sheave causes the rope 7 to elevate the hopper 4 from its normal to discharge position and to permit its restoration. The rope 7 is attached to a finger 8 fixedly secured to a plate 9 fastened to a framework 10. When the hopper 4 is to be moved to its discharge position then the entire framework 10 together with the hopper assumes the dotted position shown in Fig. 1. The hopper 4 as more clearly apparent from Figs. 4 and 5 has a pair of channels 11 which are circular throughout the greater portion of their length and then extend upwardly along the side of the hopper. These channels are adapted to ride upon rails 12 mounted upon the auxiliary framework 10. This permits the hopper 4 to roll from side to side, one limiting position being shown in dotted lines in Fig. 4. These rails 12 terminate in hooked fingers 13, 13, which hooked fingers are adapted to coöperate with pins 14 as more apparent from Fig. 4 to permit the hopper to pivot when it is near the limit of its movement, these fingers also preventing said hopper from sliding off the framework. The rails 12 have a marked decline at their extremities as more clearly apparent from Fig. 5 so that the hopper when rolling into its limiting discharge position is aided by rolling down hill upon these declining portions of the rails. Chains 15 in combination with the fingers 13 and pins 14 prevent the hopper from leaving the framework 10.

As will be more clearly apparent from Fig. 2, the channels 11 and rails 12 coöperate to prevent longitudinal displacement of the hopper. The auxiliary framework 10 is provided with a flooring 16, preferably of wood so that a flat surface is provided which can be used when the hopper 4 is removed under those conditions where it is desired to use the truck for conveying material that would not properly be accommodated for in a hopper. This flooring is shown more in detail in Fig. 3 where the hopper has been shown as removed. The truck is then provided with eyes 17 so that side walls may be provided upon the truck to accommodate the material thereon. As is clear from Fig. 2 the flooring is cut away to accommodate the channels 11 and also is cut away slightly at 18 to accommodate the chains 15, the slots 19 for instance accommodating the channel 11 operating in connection with the rail 12. The hopper has a discharge door 20 provided upon the shaft 21 so that this discharge door may be opened and closed when the hopper is to discharge its load rearwardly of the vehicle. The flooring 16 is carried upon suitable channels 21ª, which channels are fastened to cross piece 22 carried upon longitudinal stringers 23 mounted upon the chassis channels 24. The structure is likewise provided with triangular stops 25 which have integrally therewith lugs 26, which lugs are pivotally carried by shafts 27. These shafts are held in the cross piece 22, suitable recesses being cut in the cross pieces to accommodate the lugs 26. These stops 25 as will be readily clear from Figs. 4 and 5 prevent the hopper from rolling to either side of its central position. These stops may be swung about their shafts to occupy a reclining position within the flooring 16, triangular openings 28 being provided in the flooring to accommodate these stops when in their collapsed position. It will of course be apparent that these stops 25 must be placed in their collapsed position before the hopper can roll from one side to the other. Suitable lugs 29 provided with holes are arranged to accommodate a bar so that these stops can be again pushed into their uppermost position after the hopper has discharged its load. The shafts 27 have ratchet wheels 30 at their extremities which in co-operation with dogs hold these stops 25 in their uppermost position. These ratchets also serve the purpose of holding the stops 25 in an intermediate position during the time they are being moved from their collapsed position into their upright position.

Further means are provided to hold the hopper in position and these means consist of a shaft 32 controlled by a hand wheel 33. This shaft is pivotally mounted in the auxiliary framework 10 and has screw threaded engagement with a socket 34. The shaft 32 carries fingers 35 which fingers project through the rails 12 and into plates 36 fastened to the channels 11. In this way the hopper is prevented from tipping until after the framework when the load is discharged rearwardly and the hopper is at the same time held in its central position after the stop 25 has been put down, preparatory to discharging the load. The shaft 32 likewise controls a pivoted bar 37, which pivoted bar is pivoted on the framework 9 and carries a pin 38, which pin is adapted to enter a hole in the end wall of the hopper 4, thus also holding it in its central position. Normally however the stops 25 relieve the fingers 35 and pin 38 of the load as is readily apparent.

In Figs. 6 and 7, I show a modified form of the invention in which I utilize three hoppers 39, 40 and 41. These hoppers are adapted to roll from one side to the other individually so that any one can discharge its load at a time irrespective of the others. This is of great advantage for instance when a truck is going out to deliver three loads at different places, so that for instance, a truck may deliver a load of two tons of coal at three different places. The device under this condition, as is readily apparent, serves at the same time to measure the quantity of coal.

In Figs. 8 and 9, I have shown a hopper 4ª similar to the hopper 4 and adapted to be controlled exactly the same as the hopper 4 is controlled in Figs. 1 to 5 inclusive, but each hopper 4ª in addition to having the rounded bottom throughout the greater portion of its length has at its rear end 42 a square cross-section closed by a door 43 so that this hopper may be used for spreading the material throughout the width of the door 43. Such spreading effect could not be had readily with the structures shown in Figs. 1 to 5, as the discharge opening in those figures is rounded.

From what has been described the nature of my invention will be readily clear to those skilled in the art and it will also be clear that modifications within the scope of the appended claims can be readily made without departing from its spirit. Having however thus described one form which my invention may take, what I claim as new and desire to secure by Letters Patent is:

1. A truck of the character described having a hopper adapted substantially automatically to roll from one side to the other thereon for discharging its load to either side of the truck, and means whereby the hopper may be tilted rearwardly to discharge its load, said hopper having at its rear extremity a flat wide bottom to permit spreading of the material therein during the discharge operation and said hopper having a closure at its rear extremity adapted to be opened to permit of a discharge of the material when the hopper is tilted rearwardly.

2. A three way dumping hopper comprising a rail, a movable hopper adapted substantially automatically to roll on said rail from one alternative discharge position to the other, and means for tilting said hopper transversely of its aforesaid line of movement whereby it may discharge its contents in a third direction, said hopper having a closure at its rear extremity adapted to be opened to permit of a discharge of the material when the hopper is tilted rearwardly.

3. A three way dumping hopper comprising a runway, a movable hopper adapted substantially automatically to roll on said runway from one alternative discharge position to the other, and means for tilting said hopper transversely of its aforesaid line of movement whereby it may discharge its contents in a third direction, and means for holding said rolling hopper against said runway when said hopper is tilted in the third direction.

4. A three way dumping hopper comprising a runway, a movable hopper adapted substantially automatically to roll on said runway from one alternative discharge position to the other, means for tilting said hopper transversely of its aforesaid line of movement whereby it may discharge its contents in a third direction, and collapsible supports for retaining said hopper in its central position.

5. A device of the character described comprising a tiltable framework, a runway on said framework, a three way dumping hopper adapted substantially automatically to roll on said runway from one dumping position to the other, means for tilting said framework transversely of the aforesaid line of movement of said hopper whereby it may discharge its contents in a third direction, and means for holding said hopper upon said runway when said framework is tilted.

6. A device of the character described comprising a tiltable framework, a runway on said framework, a three way dumping hopper adapted substantially automatically to roll on said runway from one dumping position to the other, means for tilting said framework transversely of the aforesaid line of movement of said hopper whereby it may discharge its contents in a third direction, and means carried by said framework to hold said hopper in position on said runway when said framework is being tilted.

7. A device of the character described comprising a tiltable framework, a runway on said framework, a three way dumping hopper adapted substantially automatically to roll on said runway from one dumping position to the other, means for tilting said framework transversely of the aforesaid line of movement of said hopper whereby it may discharge its contents in a third direction, and means carried by said framework to hold said hopper in position on said runway when said framework is being tilted, said framework having a plane floor.

8. A device of the character described comprising a tiltable framework, a runway on said framework, a three way dumping hopper adapted substantially automatically to roll on said runway from one dumping position to the other, means for tilting said framework transversely of the aforesaid line of movement of said hopper whereby it may discharge its contents in a third direction, said runway extending beyond the sides of said framework to permit discharging the load from either side away from said framework.

9. A three way dumping hopper comprising a runway, a movable hopper adapted automatically to roll on said runway from its central position to either discharge position on opposite sides of said central position, means for tilting said hopper transversely of its aforesaid line of movement whereby it may discharge its contents in a third direction, and means for holding said hopper in its central position when tilted transversely as aforesaid.

10. A three way dumping hopper comprising a runway, a movable hopper adapted automatically to roll on said runway from its central position to either discharge position on opposite sides of said central position, means for tilting said hopper transversely of its aforesaid line of movement whereby it may discharge its contents in a third direction, and means for holding said hopper in its central position when tilted transversely as aforesaid, said hopper having a closure at its rear extremity adapted to be operated to permit of a discharge of the material when said hopper is tilted transversely as aforesaid.

11. In a device of the character described the combination with a framework having a fixed unyielding runway, said runway being inclined downwardly on both sides from its center, said inclination extending throughout substantially the entire length of the runway, and a rolling hopper having a rounded bottom whereby it is adapted to roll on said runway in either direction from its central position, said runway having at its extremities pivot means about which said hopper may pivot into a non-tangential position relative to said runway, when reaching its limiting position.

12. In a device of the character described the combination with a framework having a runway, said runway being inclined downwardly on both sides from its center, and a rolling hopper having a rounded bottom whereby it is adapted to roll on said runway in either direction from its central position, said runway having at its extremities pivot means about which said hopper may pivot into a non-tangential position relative to said runway when reaching its limiting position.

In witness whereof I hereunto subscribe my name this 18th day of February, A. D. 1915.

ALBERT P. LEE.

Witnesses:
  MAX W. ZABEL,
  HAZEL A. JONES.